US006951306B2

(12) United States Patent
DeLuca

(10) Patent No.: US 6,951,306 B2
(45) Date of Patent: Oct. 4, 2005

(54) THERMOSTAT HAVING MULTIPLE MOUNTING CONFIGURATIONS

(75) Inventor: Michael R. DeLuca, Mt. Laurel, NJ (US)

(73) Assignee: Lux Products Corporation, NJ (US)

( * ) Notice: Subject to any disclaimer, the term of this patent is extended or adjusted under 35 U.S.C. 154(b) by 16 days.

(21) Appl. No.: 10/716,271

(22) Filed: Nov. 18, 2003

(65) Prior Publication Data

US 2005/0103877 A1 May 19, 2005

(51) Int. Cl.$^{7}$ .......................... F25B 49/00; G05D 23/00
(52) U.S. Cl. ............................ 236/94; 62/127; 62/130
(58) Field of Search .......................... 62/125, 126, 127, 62/129, 130, 298; 236/94; 165/11.1

(56) References Cited

U.S. PATENT DOCUMENTS 4,819,714 A * 4/1989 Otsuka et al. .............. 165/217
D319,403 S 8/1991 Tiedemann
D403,972 S 1/1999 Gaskell
6,192,258 B1 * 2/2001 Kamada et al. ............. 455/566
6,460,774 B2 * 10/2002 Sumida et al. ................ 236/51
6,595,430 B1 * 7/2003 Shah ........................ 236/46 R

* cited by examiner

*Primary Examiner*—Harry B. Tanner
(74) *Attorney, Agent, or Firm*—DLA Piper Rudnick Gray Cary US LLP

(57) ABSTRACT

The invention is directed to temperature control system in which a temperature control apparatus for controlling the operation of at least one temperature-modifying device may include a thermostat housing; a controller to control the operation of the temperature modifying device in response to the electronic comparison of a measured ambient temperature with at least one set point temperature; and display for displaying information received from the controller; wherein the display may be oriented in a plurality of positions, allowing the thermostat housing to be mounted in a plurality of positions. In one embodiment, the display may be oriented in at least two positions that are rotated ninety degrees from each other using a jumper located in the controller.

20 Claims, 6 Drawing Sheets

200
206
212
208
202
75°F
*
COOL
HEAT
OFF
COOL
ON FAN
214
210
AUTO FAN
LUXPRO
216
204

THERMOSTAT HAVING MULTIPLE MOUNTING CONFIGURATIONS

FIELD OF THE INVENTION

The field of the invention is that of thermostats for controlling a heating and/or cooling system, and more particularly to a digital or programmable thermostat having multiple mounting positions.

BACKGROUND OF THE INVENTION

It has been a longstanding problem in the heating and cooling of homes and offices to efficiently regulate the ambient temperature of a medium to maintain the desired comfort level, while minimizing the amount of energy expended by the heating/cooling apparatus. The heating/cooling needs of a home or office are not constant over time and may, in fact, vary substantially depending on the time of day or day of the week. Conventional mechanical thermostats have been highly inefficient in this regard due to the fact that their mechanical components are may be inaccurate or may lose their precision over time.

In response to this, digital thermostats were developed in the prior art that utilize electronic systems and components that increase the reliability and accuracy of the thermostat over time. Such thermostats typically include one or more buttons for setting the set point temperature in a microprocessor, logic board, or other electronic component.

They may also include an electronic display for providing information to the user, such as the set point temperature, the ambient temperature, date, time, etc. They may also include other elements, such as a switch for setting the thermostat in heating or cooling mode, for example. The configuration of a digital thermostats may be found, for example, in U.S. Pat. Nos. D403,972 and D319,403.

Programmable thermostats have also been developed in the prior art that allowed for the programming of multiple set points for the thermostat, such as during different time periods based upon the time of day or day of the week. These programmable thermostats utilize a microprocessor or other electronic circuit into which the user inputs the desired temperature setting information by way of a keypad or some other arrangement of buttons and switches.

Such thermostat are only mountable, however, in one position or configuration. Users do not have any options as to how the thermostat is mounted. Accordingly, it would be beneficial to provide a digital or programmable that may be mounted in multiple positions.

SUMMARY OF THE INVENTION

Embodiments of the invention may include a system for temperature which is mountable in more than one position or configuration. A temperature control apparatus for controlling the operation of at least one temperature-modifying device may include a thermostat housing; a controller to control the operation of the temperature modifying device in response to the electronic comparison of a measured ambient temperature with at least one set point temperature; and display for displaying information received from the controller; wherein the display may be oriented in a plurality of positions, allowing the thermostat housing to be mounted in a plurality of positions. In one embodiment, the display may be oriented in at least two positions that are rotated ninety degrees from each other using a jumper located in the controller.

BRIEF DESCRIPTION OF THE DRAWINGS

The foregoing and other aspects and advantages will be better understood from the following detailed description of the invention with reference to the drawings, in which.

DETAIL DESCRIPTION

The invention will be understood more fully from the detailed description given below and from the accompanying drawings of the preferred embodiments of the invention; which, however, should not be taken to limit the invention to a specific embodiment, but are for explanation and understanding only.

Figure 1:
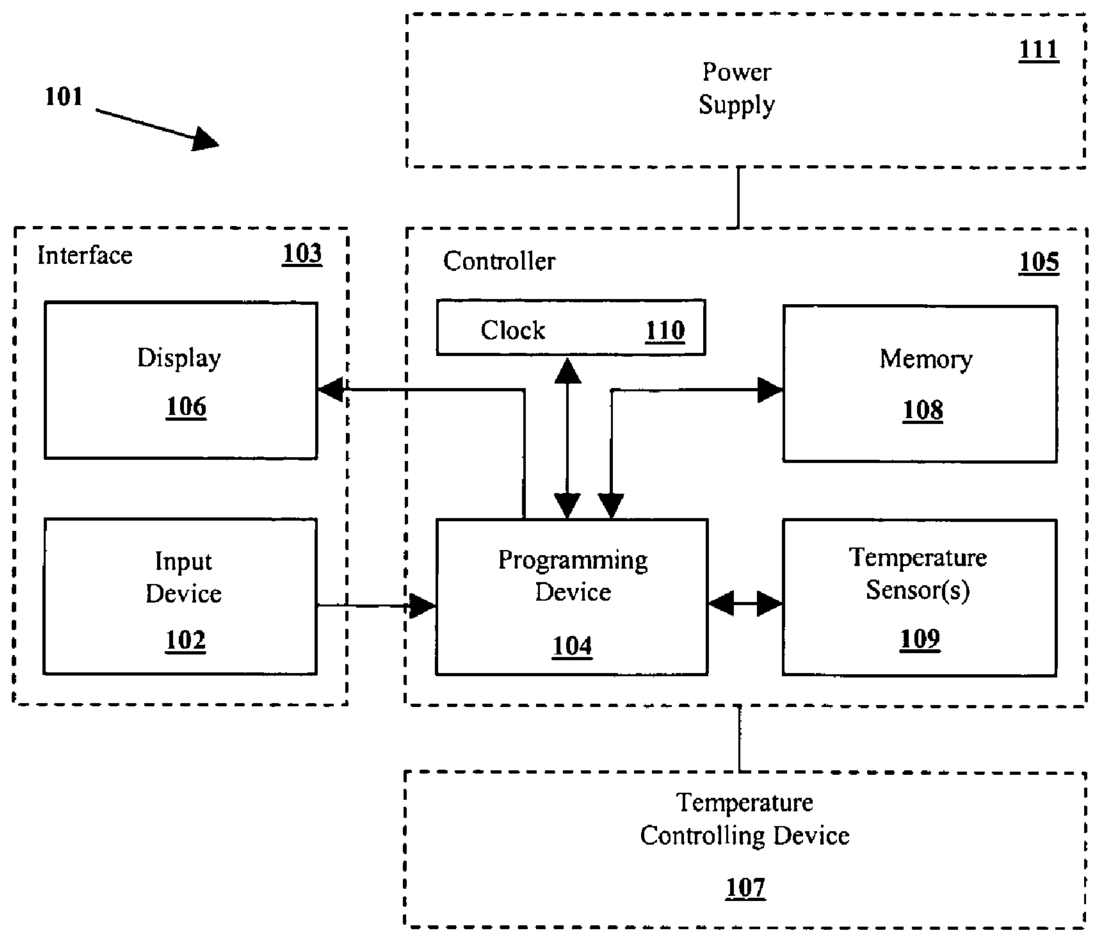
FIG. 1 is a block diagram of a thermostat.

FIG. 1 contains a block diagram of an embodiment of a digital or programmable thermostat. Those of ordinary skill in the art will appreciate that the invention is not limited thereto and may comprise any device or configuration of components capable of operating in the manner of the invention. In the embodiment disclosed herein, information regarding the desired set point temperature, date, or time may be inputted to thermostat 101 by the user through input device 102 in interface 103. Interface 103 may be connected to a programming device 104 of controller 105 in such a way that programming device 104 receives information inputted at input device 102, and may display this information on display device 106.

Programming device 104 may comprise any device capable of operating in the manner of the invention, such as a logic circuit on a logic board, a microprocessor, or other integrated circuit. Similarly, memory 108 may comprise electronic memory, such as RAM, SRAM, or DRAM, and the like, in an integrated circuit, such as a PROM, EPROM, or EEPROM and the like. Memory 108 may also form part of programming device 104 and is used thereby for performing the programmed thermostat functions. Display device 106 is also not particularly limited and may comprise, for example, an electronic display, such as an LCD, LED, and the like. Input device 102 may include pressure sensitive buttons, keypads, or any other device or arrangement of devices that are capable of entering the appropriate information. The operation of such devices is well known to those of ordinary skill in the art.

One or more temperature sensor(s) 109 may be used detect ambient temperature of the medium to be controlled, which programming device 104 may compare with the desired control (set point) temperature, as determined by programming device 104 and stored in memory 108. Temperature sensor(s) 109 may detect the current ambient temperature by using a conventional temperature-sensing device, such as a thermistor, thermocouple, memory metal (e.g., a nickel-titanium alloy), a bimetallics metal strip, or other type of temperature transducer.

A clock 110 may be connected with programming device 104 in order to provide time related information thereto for use in connection with the operation of programming device 104 and its program of temperature control. Time related information from clock 110 may also be stored in memory 108 and shown on display 106. Clock 110 may comprise any device for providing time related information, such as a voltage controlled oscillator (VCO), crystal oscillator, and the like, along with associated circuitry. The time related information provided by clock 110 is not limited and may comprise, for example, chronological time information, such as year, month, day, hour, minutes, and/or seconds, or synchronization information for programming device 104 (which may be used to calculate this information). Clock 110 may also form a part of programming device 104.

The operation of controller 105 and/or interface 103 may be powered by power supply 111. Power supply 111 is not particularly limited, but may comprise any source of power capable of operating controller 105 and interface 103, such as household current (e.g., 120 v AC at 60 Hz).

Figure 2:
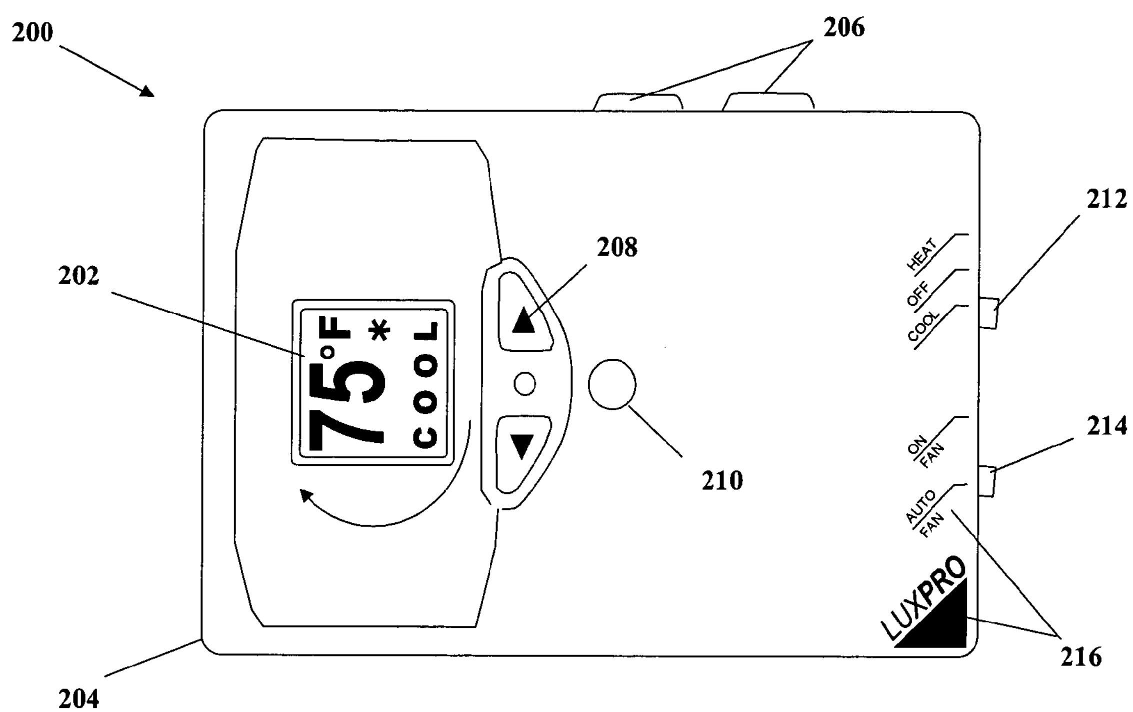
FIG. 2 is a front elevation of a thermostat in accordance with aspects of the invention.
Figure 3A:
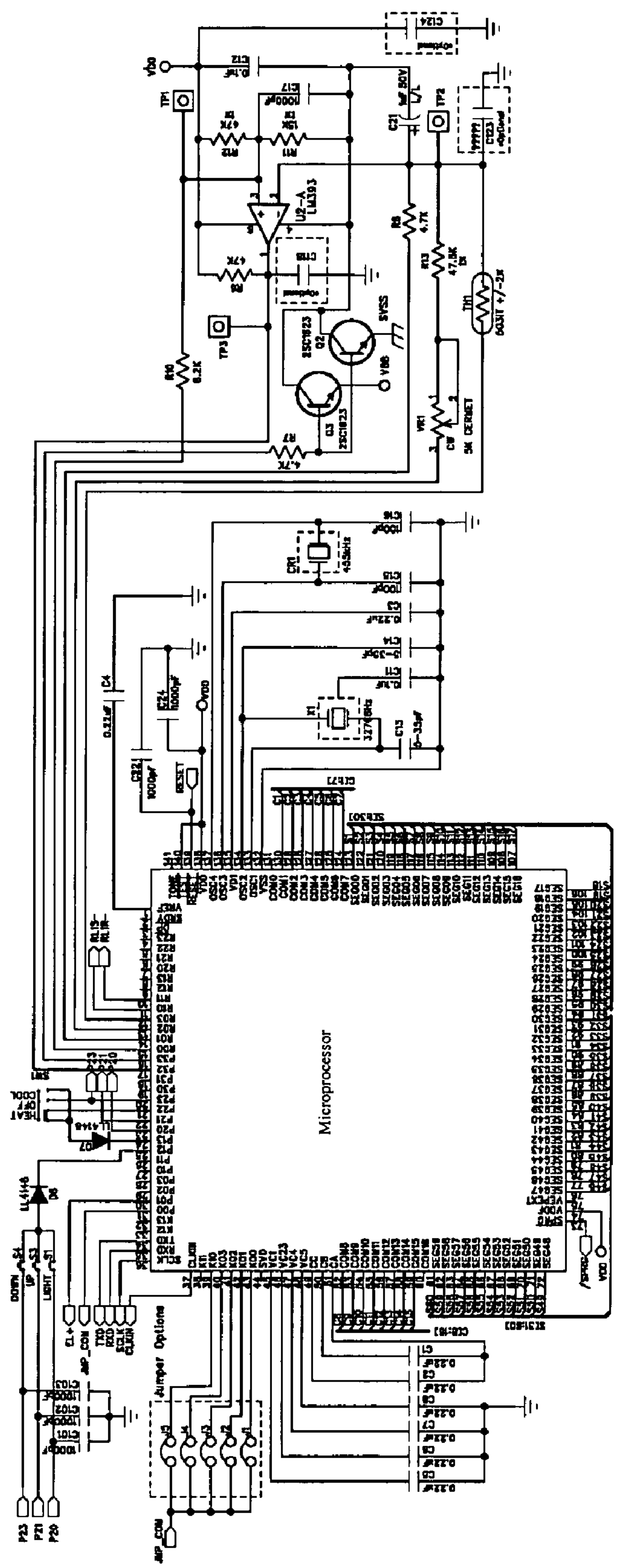
FIGS. 3(*a*)–(*d*) are partial schematics of thermostat in accordance with aspects of the invention.
Figure 3B:
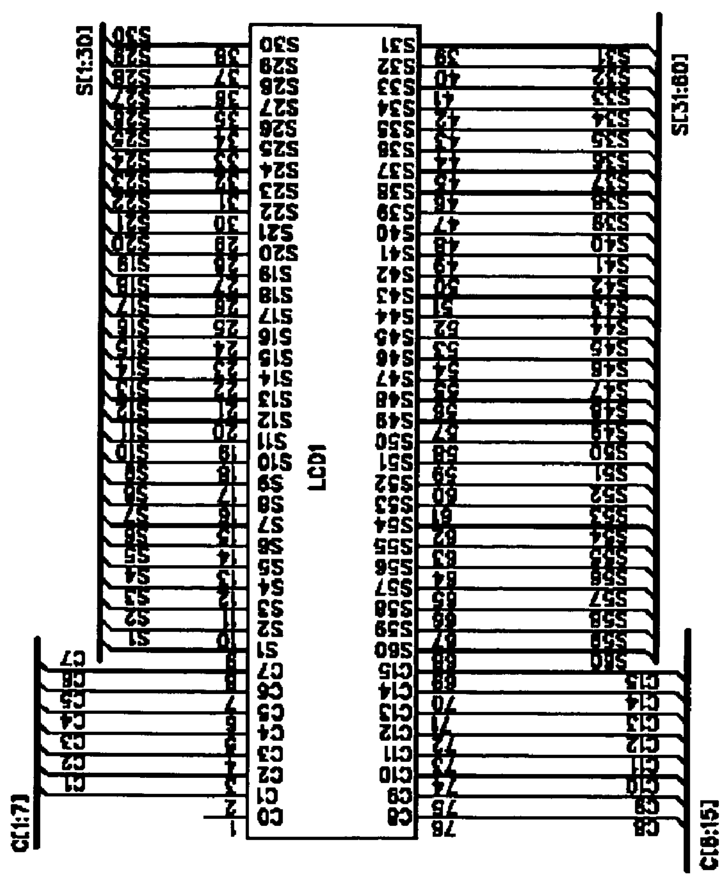
Figure 3C:
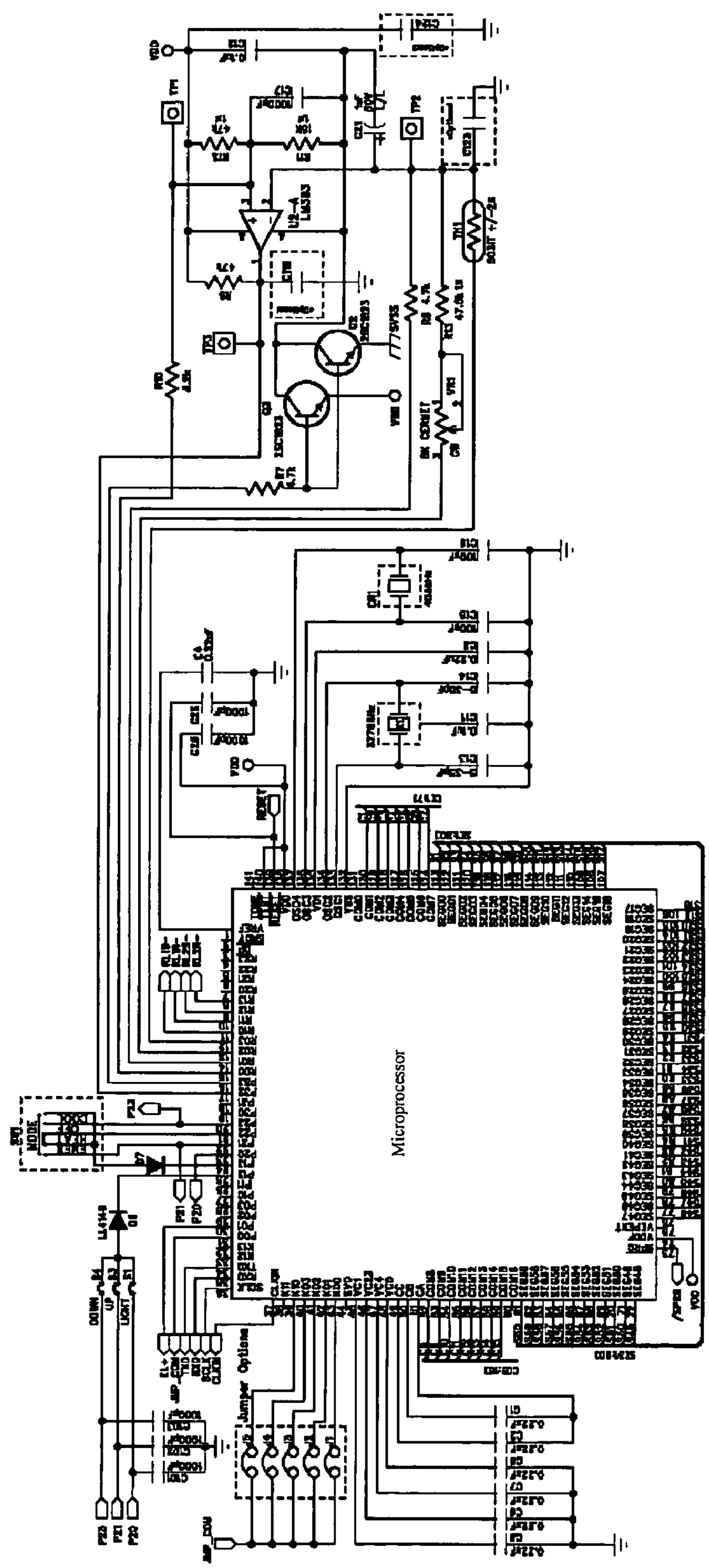
Figure 3D:
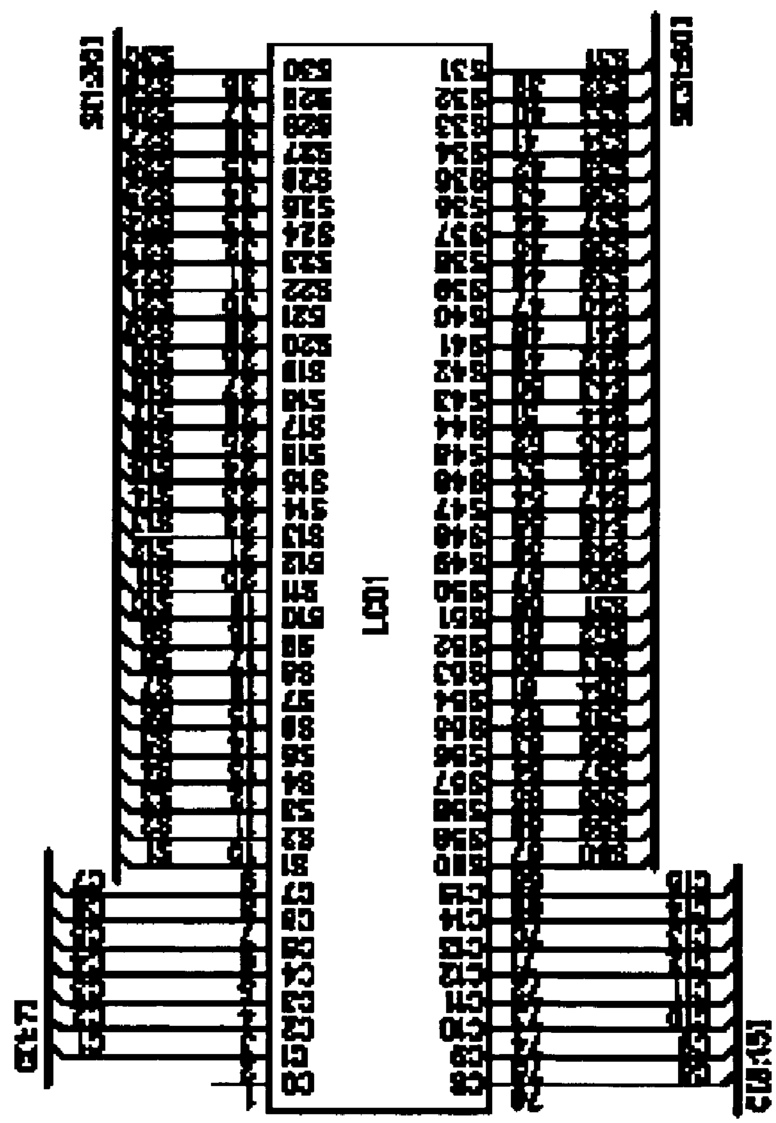

FIG. 2 illustrates an example of a thermostat in accordance with aspects of the invention, in this example a digital thermostat, although the invention is not limited thereto. As shown in FIG. 2, thermostat 200 may include an outer casing 204 to house the aforementioned components. Display window 202 maybe used for housing display 106 (FIG. 1) for interaction with the user. Switches 212 maybe used for switching between heating and cooling modes. Switches 214 may be used for switching an air handling fan from automatic mode to a constant "on" mode. Buttons 208 may further be used for inputting information into the thermostat, with information being presented on display 106 through display window 202. Switches 212 and 214, as well as buttons 208 may be in communication with input device 102 (FIG. 1) for inputting information into the thermostat. Button 210 may also be included for activating a backlight for display 106 (FIG. 1) through display window 202, allowing the user to view the display under darkened conditions. Tabs 206 may be included to allow the unit to be separated from a wall plate to mount and wire the unit, change the option jumpers, replace the batteries, etc. Of course, these aspects of thermostats and temperature control are well known in the art and will not be further elaborated upon here.

Display 106 (FIG. 1) viewed through display window 202 may be oriented in more than one position. Thermostat 200 may also include identifying information and labeling 216, which is readable by the user irrespective of the mounting configuration of the thermostat. This provides the significant advantage that the thermostat may be mounted in a plurality of positions. For example, the display 106 may be rotatable by ninety degrees, allowing the thermostat itself to be mount in two different positions. In the example shown, this would mean that thermostat 200 may be rotated ninety degrees in a clockwise direction, as shown by the arrow in FIG. 2, although the invention is not limited thereto. Alternatively, display 106 may present information configured to be readable simultaneously in two or more orientations. Switches 212 and 214 may then be mounted on the side or the bottom of the thermostat, respectively, while labeling 216 would be readable by the user in either configuration.

A schematic of an embodiment of a controller 105 of the invention for use with the aforementioned temperature control is illustrated in FIGS. 3(*a*)–(*b*) for most conventional heating and cooling system, and as in FIGS. 3(*c*)–(*d*) for heating/cooling systems utilizing a heat pump. As shown in the figures, a microprocessor may be powered by a DC power board, and, in turn, power an LCD display. The microprocessor may have a plurality of outputs to individual segments on the LCD display for outputting information thereto to be viewed by the user. The microprocessor may also include the plurality of inputs/outputs to a temperature modifying device and to a series of switches (e.g., next, hold, down, and up).

In the illustrated embodiment, one or more jumpers may be included for orienting the display. By setting this jumper in one position (e.g., "closed"), the display may be readable in one configuration relative to the outer casing, switches, buttons, and labeling of the thermostat. By switching the jumper to another position (e.g., "open"), the display configuration may be rotated by ninety degrees (e.g., clockwise, although not limited thereto) relative to the casing.

Of course, those of ordinary skill in the art will appreciate that this is only one possible embodiment of the invention and is not limited thereto.

While the invention as disclosed herein has been described in relation to specific embodiments thereof, it is understood that the invention is not limited to the particular embodiment disclosed herein, but only as set forth in the appended claims. It will be appreciated that various components known to those of skill in the art may be substituted for those described herein without departing from the spirit and scope of the invention as set forth in the appended claims. For example, the input device may include a pressure keypad or a series of contact switches instead of the pressure switches disclosed herein. The display device may also include an LED display or other illuminated display mechanisms, or any of a number of conventional mechanical display mechanisms such as gauges or the like. The invention may be used in connection with any device that controls temperature.

What is claimed is:

1. A temperature control apparatus for controlling the operation of at least one temperature-modifying device, said apparatus comprising:

a thermostat housing;

a controller to control the operation of said at least one temperature modifying device in response to the electronic comparison of a measured ambient temperature with at least one set point temperature; and display for displaying information received from said controller;

wherein said display may be oriented in a plurality of positions, allowing said thermostat housing to be mounted in a plurality of positions.

2. The apparatus of claim 1, wherein said controller contains an electrical jumper for orienting said display.

3. The apparatus of claim 1, wherein said display may be oriented in two positions, each position being rotated ninety degrees from the other.

4. The apparatus of claim 1, wherein said thermostat housing has labeling that is readable any of said plurality of mounting positions.

5. The apparatus of claim 1, wherein said temperature control apparatus comprises one or more selected from the group consisting of a digital thermostat and a programmable thermostat.

6. The apparatus of claim 1, wherein said controller comprises a programming device for implementing a temperature control program, a memory for storing said temperature control program and temperature related information, a temperature comparator for comparing said ambient temperature with said set point temperature.

7. The apparatus of claim 6, further comprising at least one temperature sensor, in communication with said programmable controller, for sensing said ambient temperature.

8. The apparatus of claim 7, wherein said temperature sensor comprises one or more selected from the group consisting of a thermistor, a thermocouple, memory metal, and a bimetallic strip.

9. The apparatus of claim 1, wherein said controller comprises one or more selected from the group consisting of a logic circuit on a logic board, a microprocessor, and an integrated circuit.

10. A thermostat comprising:

a housing;

a controller to control the operation of said at least one temperature modifying device in response to the electronic comparison of a measured ambient temperature with at least one set point temperature; and display for displaying information received from said controller;

wherein said display may be oriented in at least two positions that are rotated ninety degrees apart relative to said thermostat housing, allowing said thermostat housing to be mounted in a plurality of positions.

11. The apparatus of claim 10, wherein said controller contains an electrical jumper for orienting said display.

12. The apparatus of claim 10, wherein said thermostat housing has labeling that is readable any of said plurality of mounting positions.

13. The apparatus of claim 10, wherein said temperature control apparatus comprises one or more selected from the group consisting of a digital thermostat and a programmable thermostat.

14. The apparatus of claim 10, wherein said controller comprises a programming device for implementing a temperature control program, a memory for storing said temperature control program and temperature related information, a temperature comparator for comparing said ambient temperature with said set point temperature.

15. The apparatus of claim 14, further comprising at least one temperature sensor, in communication with said programmable controller, for sensing said ambient temperature.

16. The apparatus of claim 15, wherein said temperature sensor comprises one or more selected from the group consisting of a thermistor, a thermocouple, memory metal, and a bimetallic strip.

17. The apparatus of claim 10, wherein said controller comprises one or more selected from the group consisting of a logic circuit on a logic board, a microprocessor, and an integrated circuit.

18. A method of configuring a thermostat comprising a thermostat housing, a controller to control the operation of at least one temperature modifying device in response to the electronic comparison of a measured ambient temperature with at least one set point temperature, and a display for displaying information received from said controller, said method comprising the step of setting a default orientation of said display in one of a plurality of orientations relative to said thermostat housing.

19. The method of claim 18, wherein said default orientation is set using an electrical jumper in said controller.

20. The method of claim 18 wherein said display may be oriented in two positions, each position being rotated ninety degrees from the other.

* * * * *